US012584576B2

(12) United States Patent
Merlet et al.

(10) Patent No.: US 12,584,576 B2
(45) Date of Patent: Mar. 24, 2026

(54) PLUG CONNECTOR COMPRISING VERIFICATION ELEMENT

(71) Applicant: NORMA Germany GmbH, Maintal (DE)

(72) Inventors: Laurent Merlet, Guichen (FR); Cedric Gallou, Guichen (FR); Stéphane Gaudin, Guichen (FR)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 18/267,573

(22) PCT Filed: Nov. 10, 2021

(86) PCT No.: PCT/EP2021/081295
§ 371 (c)(1),
(2) Date: Jun. 15, 2023

(87) PCT Pub. No.: WO2022/128266
PCT Pub. Date: Jun. 23, 2022

(65) Prior Publication Data
US 2024/0102594 A1 Mar. 28, 2024

(30) Foreign Application Priority Data
Dec. 18, 2020 (DE) ...................... 10 2020 134 230.6

(51) Int. Cl.
*F16L 37/14* (2006.01)
(52) U.S. Cl.
CPC ......... *F16L 37/142* (2013.01); *F16L 2201/10* (2013.01); *F16L 2201/60* (2013.01)
(58) Field of Classification Search
CPC ... F16L 37/0885; F16L 37/1225; F16L 37/14; F16L 37/142; F16L 37/144; F16L 2201/10; F16L 2201/60
See application file for complete search history.

(56) References Cited

U.S. PATENT DOCUMENTS 7,316,425 B2 * 1/2008 Poder .................. F16L 37/0841
285/305
9,127,797 B2 * 9/2015 Nezu .................... F16L 37/0841
(Continued)

FOREIGN PATENT DOCUMENTS

DE 202012102296 U1 * 9/2012
DE 102012013305 A1 * 1/2014 .............. F16L 37/14
(Continued)

OTHER PUBLICATIONS

Translation of DE-202012102296-U1 (Year: 2012).*
(Continued)

*Primary Examiner* — Matthew Troutman
*Assistant Examiner* — Alexander T Rufrano
(74) *Attorney, Agent, or Firm* — REISING ETHINGTON, P.C.

(57) ABSTRACT

A plug connector includes a housing, a locking element and a verification element. The housing has a receiving chamber, a connection piece and a duct through which fluid can flow. The locking element is movable between an open position and a fastening position, a plug can be inserted in the receiving chamber in the open position of the locking element, and a plug inserted in the receiving chamber can be fastened within the receiving chamber via the locking element in the fastening position of the locking element. In an open position of the locking element, the verification element is at least partially covered by the locking element, and in a fastening position of the locking element, the verification element can be read.

9 Claims, 3 Drawing Sheets

(56)  References Cited

U.S. PATENT DOCUMENTS

| | | | | |
|---|---|---|---|---|
| 9,583,860 | B1 | 2/2017 | DeWitt | |
| 11,698,157 | B2 * | 7/2023 | Gocha | F16L 37/144 |
| | | | | 285/84 |
| 11,774,024 | B2 * | 10/2023 | Barthel | F16L 37/0885 |
| | | | | 285/93 |
| 11,796,099 | B2 * | 10/2023 | Gocha | F16L 37/0885 |
| 12,104,732 | B2 | 10/2024 | Hartmann | |
| 2012/0242080 | A1 | 9/2012 | Nezu | |
| 2019/0333420 | A1 * | 10/2019 | Danielson | F16L 37/20 |
| 2020/0166167 | A1 | 5/2020 | Hagen et al. | |
| 2020/0355308 | A1 | 11/2020 | Hunt et al. | |
| 2021/0396336 | A1 | 12/2021 | Schröter | |
| 2022/0243850 | A1 | 8/2022 | Teasley et al. | |
| 2022/0275894 | A1 * | 9/2022 | Baldreich | F16L 37/0885 |
| 2022/0299143 | A1 | 9/2022 | Gabbey et al. | |
| 2023/0108924 | A1 | 4/2023 | Teasley et al. | |
| 2024/0003474 | A1 * | 1/2024 | Schröter | F16L 37/0887 |

FOREIGN PATENT DOCUMENTS

| | | | |
|---|---|---|---|
| DE | 102018219440 | A1 | 5/2020 |
| EP | 3736481 | A1 | 11/2020 |
| JP | 2011094668 | A | 5/2011 |
| JP | 2018535524 | A | 11/2018 |
| JP | 2020183813 | A | 11/2020 |
| KR | 20200040816 | A | 4/2020 |
| WO | WO2021042148 | A1 | 3/2021 |
| WO | WO2021237261 | A1 | 12/2021 |

OTHER PUBLICATIONS

JP Office Action for JP Application No. 2023-521033 dated May 8, 2024 (14 pages).
German Office Action for German Application No. 102020134230.6 dated Sep. 15, 2021 (4 pages).
International Search Report for International Application No. PCT/EP2021/081295 dated Feb. 7, 2022 (13 pages).
English Translation of International Search Report for International Application No. PCT/EP2021/081295 dated Feb. 7, 2022 (2 pages).
1 German Office Action for German Patent Application No. 21 814 700.7 dated Oct. 17, 2024 (6 pages).
Korean Office Action for Korean Patent Application No. 10-2023-7011254 dated Jan. 2, 2025 (6 pages).
English Translation of Korean Office Action for Korean Patent Application No. 10-2023-7011254 dated Jan. 2, 2025 (5 pages).

* cited by examiner

PLUG CONNECTOR COMPRISING VERIFICATION ELEMENT

INTRODUCTION

The disclosure relates to a plug connector and to a method for producing and verifying a plug connection.

Plug connectors are intended to ensure a correct and tight connection between two fluid-conducting components to be connected. These include, for example, connection pieces in particular of a storage vessel or a consumption point, pipes, canister connections, or another fluid line. In order to allow secure assembly for example in motor vehicle manufacture, it can be important to be able to quickly and unambiguously identify whether a connection has been assembled correctly.

For this purpose, safety features are usually provided on the plug connector, which are intended to allow a simple monitoring of correct connection. For example, it may be provided that a safety needle has to be removed during or after actuation of a locking element for fastening a plug. This allows a quick visual check to ensure that a connection has been established, by checking whether the safety needle has been removed or is still present. Nevertheless, it typically must be mechanically checked during the assembly process that a connection has been made correctly so that a sufficient tightness can thus also be ensured.

It is additionally known to provide a colored marking, in particular in the form of a dot or a line, which is only visible when a plug is inserted and fastened in the plug connector.

A disadvantage with this type of checking, under certain circumstances, is that it has to be performed mechanically or visually by an engineer. These methods are thus susceptible to human error.

SUMMARY

An object of the disclosure, per at least some embodiments, is now to overcome the disadvantages of the prior art and to provide a plug connection that allows quick and reliable identification of a correct connection between a plug connector and a plug.

The disclosure relates to a plug connector comprising a housing, a locking element and a verification element, wherein the housing has a receiving space, a connection piece and a duct through which fluid can flow, wherein the locking element is movable between an open position and a fastening position, wherein in the open position of the locking element a plug can be inserted into the receiving space and in the fastening position of the locking element a plug inserted into the receiving space can be fastened by the locking element within the receiving space. Here, the verification element in an open position of the locking element is at least partially covered by the latter and in a fastening position of the locking element is readable.

The duct through which a fluid can flow connects the receiving space and the connection piece to one another.

The term 'plug' is used herein for all male connection elements which can be connected by means of plug connectors, including for example pins and pipe ends.

Due to the design according to at least some embodiments of the disclosure, the verification element is then only sufficiently visible and thus readable if a correct connection has been achieved between plug connector and plug. It can thus be ensured quickly and reliably that a correct connection has been established. If no plug is fastened in the connector, the locking element covers the verification element at least in part. This means that at this moment in time the verification element is not readable. The locking element is correspondingly in an open position.

Alternatively, it may be provided structurally that in an open position the locking element fully covers the verification element.

If a plug is inserted into the plug connector and the locking element is moved into the fastening position, the plug is fastened in the plug connector. The verification element is released by the movement of the locking element, in particular is released to such an extent that the verification element is readable.

In an embodiment the connection piece has a fir tree structure. A tube can thus be slid on easily. The term "tube" is used herein in particular for flexible tubes made of an extruded plastic, but can also be formed by an inflexible pipe, a hose or something comparable.

The connection piece, per an embodiment, has an outer sealing ring in the form of an O-ring, which is arranged in particular in the region of the fir tree structure. An additional tightness between tube and connection piece is hereby ensured.

A tube slid onto the connection piece can be held for example additionally or alternatively with the aid of a clamping element, for example a hose clamp or the like.

The verification element is, per an embodiment, connected fixedly and non-movably to the housing, in particular in a form-fitting, frictionally engaged or integrally bonded manner. It is hereby ensured that the verification element cannot be manipulated before or during assembly of the plug connector.

In an embodiment the verification element is mounted on a tab which protrudes in the radial direction toward the housing. A radial protrusion of the tab relative to the housing allows the tab with the verification element to be easily reached, which facilitates reading of the verification element.

The tab is preferably arranged substantially perpendicularly on the housing and thus also in particular perpendicular to the fluid duct or to a longitudinal extent of the housing. The tab is arranged here in particular on an outer circumference of the housing.

The verification element is, per an embodiment, arranged on a surface of the tab that points in the axial direction of the housing, in particular in the direction of the locking element. By moving the locking element in the radial direction, a verification element on a tab arranged in such a way can be at least partly covered or can be open, depending on the position of the locking element.

A plug is fastened in the receiving space, per an embodiment, by two fastening elements, a retaining element and a locking element. A first fastening of the plug in the plug connector is achieved by a retaining element once the plug has been slid into the receiving space, the retaining element preventing the plug from shifting back. The retaining element can be formed here for example as a sickle-shaped or annular lip. A final and stable fastening is achieved by closing the locking element, in particular by pressing it down. The locking element interacts here in particular with the plug, for example by latching with the plug. Once the plug has been fastened with the locking element, the locking element remains in the fastening position, whereby the verification element is permanently readable, in particular at least as long as correct fastening by the locking element is ensured.

A plug is, per an embodiment, fastenable in the receiving space by latching the locking element. A latched connection between locking element of the plug connector and a plug introduced into the receiving space represents a simple, economically producible and secure fastening possibility. Once the locking element has been latched and once the plug has been correctly assembled in the receiving space of the plug connector, the verification element is readable.

In particular, the locking is in particular permanently arrangeable firstly in a fastening position, if a plug is arranged and fastened correctly in the receiving space of the plug connector. If the plug is not correctly assembled, the locking element cannot be positioned continuously in the fastening position. A permanent arrangement of the locking element in the fastening position means that this position is maintained as long as the plug is correctly fastened in the plug connector. Detaching the plug connector from the plug ends the permanent arrangement of the locking element in the fastening position, and the locking element is moved back into the open position as a result of the detachment.

In an embodiment the locking element is movable between the open position and the fastening position in the radial direction toward the housing. In particular, the locking element in an open position is further distanced radially from the receiving space than in the fastening position. In particular, the locking element in the open position is arranged at least partly further outside the housing than in the fastening position.

The housing and the tab are, per an embodiment, formed in one part with the verification element.

In an alternative embodiment the housing and the tab are formed in a number of parts and in particular are adhesively bonded, welded or clipped to one another.

Here, the verification element is, per an embodiment, affixed to a tab which protrudes radially from a ring which in particular has the shape of an end of the housing. In particular the ring has the shape of the housing at the end of the plug connector at which the receiving space is arranged. In particular the ring is connected to the housing at the end of the housing at which the receiving space is arranged. The ring is, per an embodiment, connected flat to the end of the housing.

In an embodiment the verification element is machine-readable. When checking for correct fastening of plug connectors, human errors on account of incorrectly read security features can thus be avoided. An automated check can thus also be performed.

The verification element particularly, per an embodiment, has a machine-readable code based on optical information, in particular a barcode or QR code. A barcode is understood here to mean a line code. A QR code is a two-dimensional pattern which is machine-readable on the basis of optical differences and is usually electrically connected or connectable to associated information. A plug connector with a verification element can hereby be produced easily and cost-effectively.

The machine-readable code of the verification element is, per an embodiment, a 1D or 2D code.

Machine reading of the verification element, in particular based on optical information, can be performed for example with the aid of a scanner.

In an embodiment the verification element has a machine-readable chip, in particular an RFID chip which is readable only from the side of the tab on which the locking element is arranged.

In an embodiment the plug connector has a handle which is fastened in particular to the housing or to the locking element. The assembly and handling of the plug connector is hereby facilitated.

In an embodiment at least a first seal, in particular in the form of an O-ring, is arranged in the housing inside the duct. The tightness between plug connector and plug is hereby increased.

In a development a second seal, in particular in the form of an O-ring, is arranged in the housing. In particular a spacer is arranged between the first and second seal. The tightness between plug connector and fastened plug is hereby further improved. In addition, the seals are held in position by the spacer.

The components of the plug connector, in particular the housing and the locking element and also a tab for the verification element, are formed from plastic.

The disclosure additionally relates to a method for producing and verifying a plug connection comprising the following method steps in the stated order:

providing a plug connector according to the disclosure,
  inserting a plug into the receiving space of the plug connector,
  moving the locking element from an open position into a fastening position, wherein the locking element in the fastening position interacts with the plug in the receiving space and fastens it in the receiving space,
  checking the fastening of the plug in the receiving space by reading the verification element on the plug connector.

Due to the movement of the locking element from the open position into the fastening position, the verification element is released from an at least partly covered arrangement and is readable. As soon as the locking element interacts with the plug and fastens it, the locking element remains continuously in the fastening position so that the verification element can be read comfortably. By reading the exposed verification element it is ensured that the connection between plug connector and plug has been produced correctly and continuously.

In an embodiment the verification element is machine read. This reduces the likelihood that connections are made incorrectly as the result of human error and are incorrectly verified positively.

The features, advantages and method steps explained in conjunction with the plug connector are transferrable analogously to the method for producing a plug connection with the aid of the plug connector.

BRIEF DESCRIPTION OF THE FIGURES

Further features, details and advantages of the invention will become clear from the wording of the claims and from the following description of exemplary embodiments with reference to the drawings, in which:

DETAILED DESCRIPTION

Figure 1:
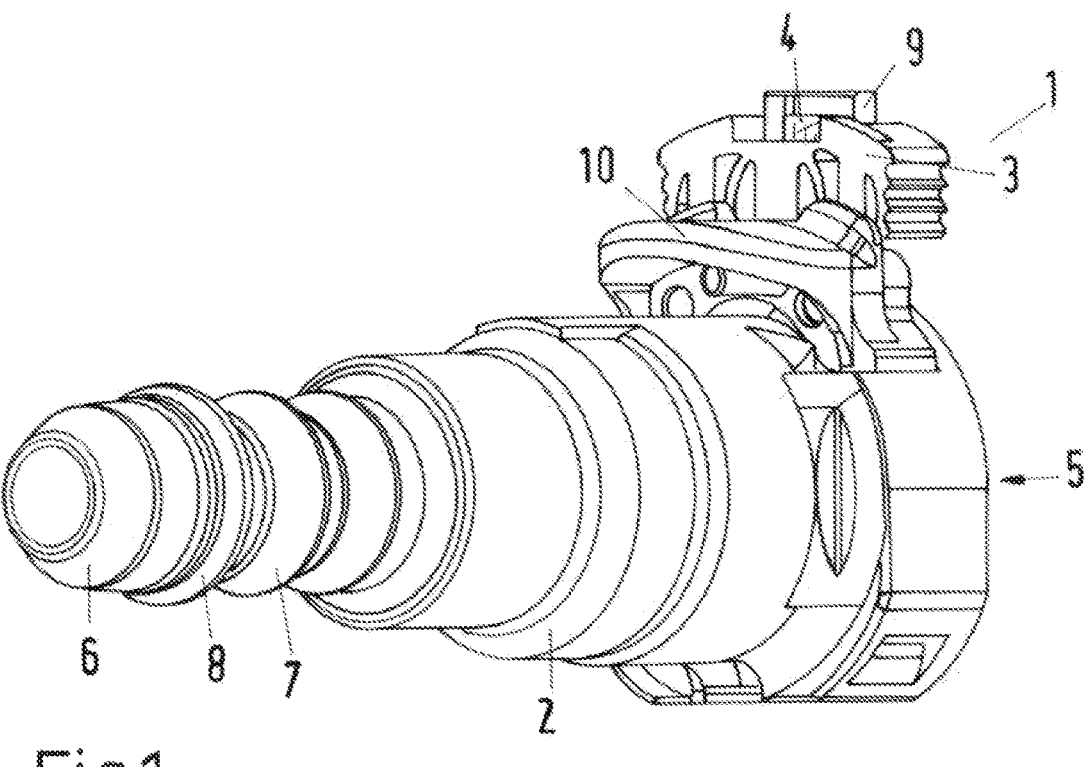
FIG. 1 shows a perspective view of a plug connector with locking element in an open position.

FIG. 1 shows a perspective view of a plug connector 1 with a housing 2 and a locking element 3, which is in an open position and at least partly covers a verification element 4. The housing 2 has a receiving space 5 and a connection piece 6. In the embodiment shown by way of example, the connection piece 6 has a fir tree structure 7, on which there is mounted an outer seal in the form of an O-ring.

The verification element 4 is mounted in the form of an optically readable code to a tab 9 which protrudes in the radial direction relative to the housing 2. In particular the verification element 4 is arranged on a face if the tab 9 that is oriented in the axial direction of the housing 2 and thus parallel to a longitudinal extent of the housing 2 and points in the direction of the locking element 3. In the shown embodiment the code consists of a QR code.

A handle 10 for simpler handling is connected to the housing 2.

Figure 2:
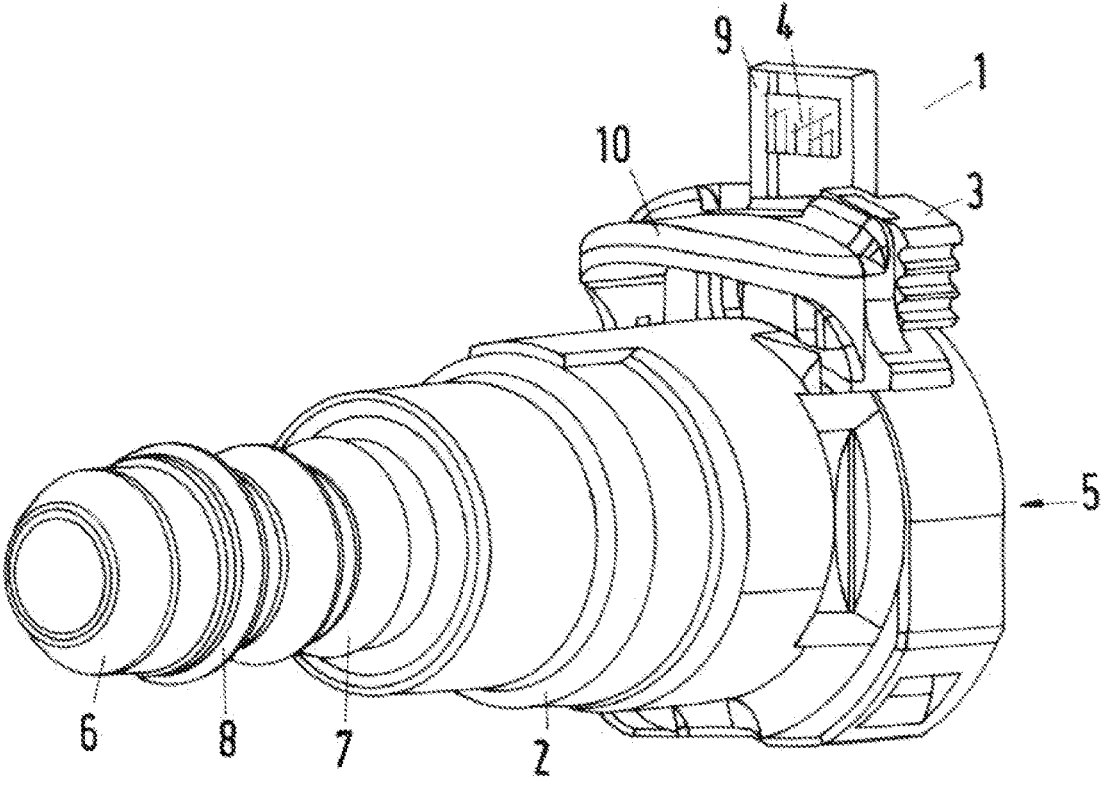
FIG. 2 shows a perspective view of a plug connector with locking element in a fastening position.

FIG. 2 shows a perspective view of a plug connector 1 with locking element 3 in the fastening position. If the locking element 3 is pushed downward from the open position shown in FIG. 1, in the radial direction of the housing, toward the receiving space, a plug can be fastened in the receiving space. At the same time the verification element 3 is exposed. This fastening position of the locking element is made possible continuously by interaction of the locking element with a plug, not shown, so that the verification element can be read in order to check a correct fastening. In the fastening position of the locking element 3, the verification element 4 is thus readable.

Figure 3:
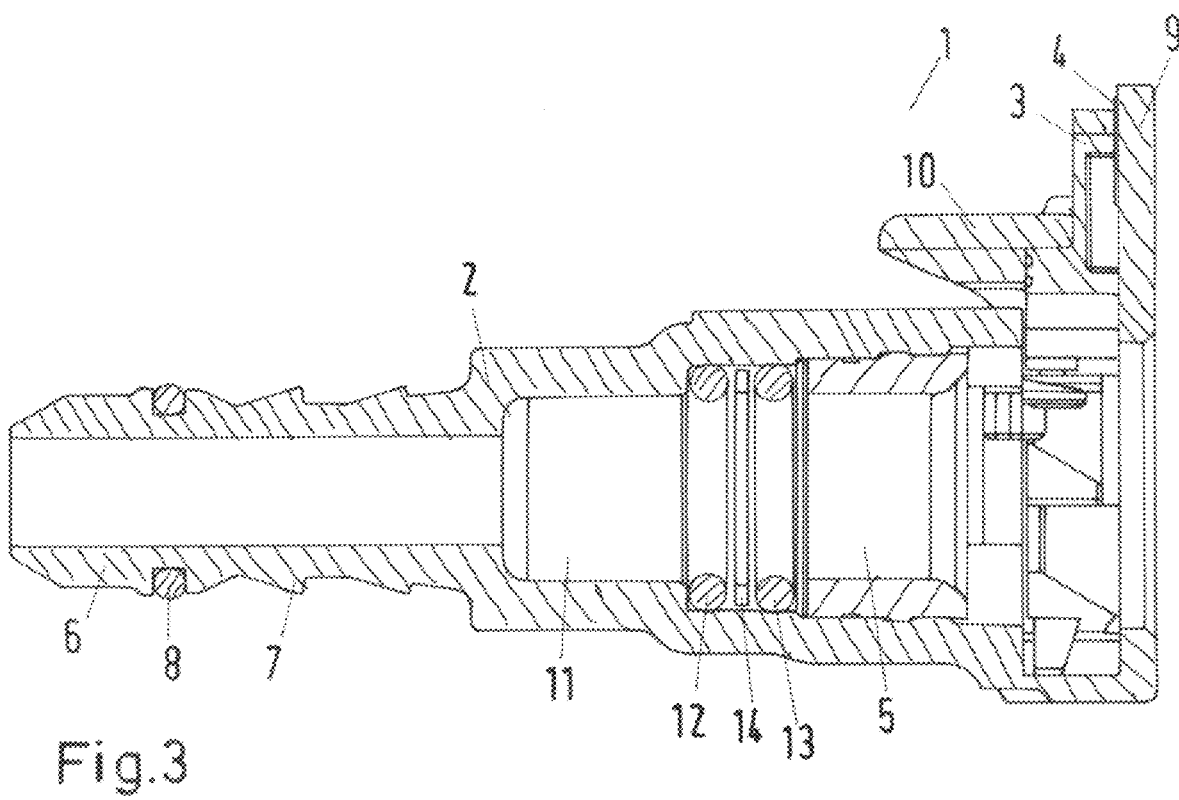
FIG. 3 shows a longitudinal section of a plug connector with locking element in an open position.

FIG. 3 shows a longitudinal section of a plug connector 1, wherein the locking element is in an open position and the verification element 4 on the tab 9 is at least partly covered, in particular covered to such an extent that it is not readable.

Besides the receiving space 5 and the connection piece 6, the housing has a duct 11 through which fluid can flow and which connects the receiving space 5 and the connection piece 6 to one another. The receiving space 5, connection piece 6 and duct 11 are interconnected such that fluid can flow through.

A first and second seal 12, 13 are provided in the receiving space 5, in particular in the form of O-rings, which are distanced from one another by a spacer 14.

Figure 4:
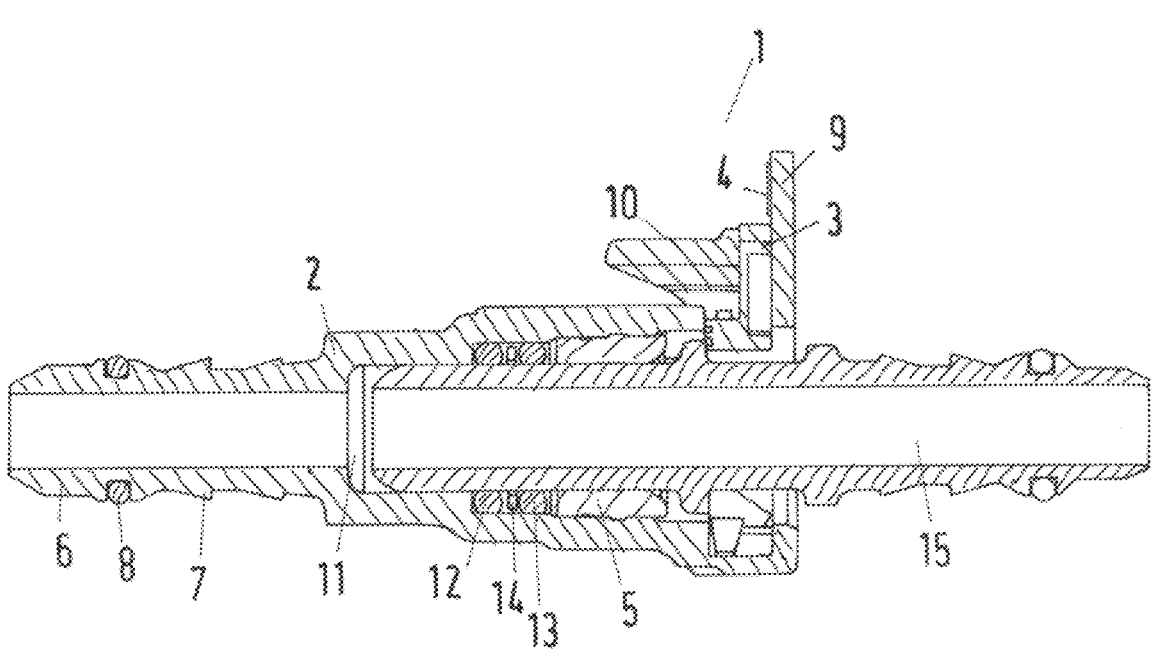
FIG. 4 shows a longitudinal section of a plug connector with locking element in a fastening position

FIG. 4 likewise shows a longitudinal section of a plug connector 1, but in contrast to FIG. 3 with the locking element in a fastening position. Here, a plug 15 is inserted into the receiving space 5. By moving the locking element 3 in the radial direction, it interacts with the plug 15, in particular latches with the plug 15. The plug is thus fastened securely and tightly in the receiving space 5 of the plug connector 1 and at the same time fixes the locking element 3 in the fastening position. In the fastening position of the locking element 3, the verification element 4 is no longer covered by the locking element and is now readable. A fastening of the plug 15 in the plug connector 1 can thus be easily verified.

Figure 5:
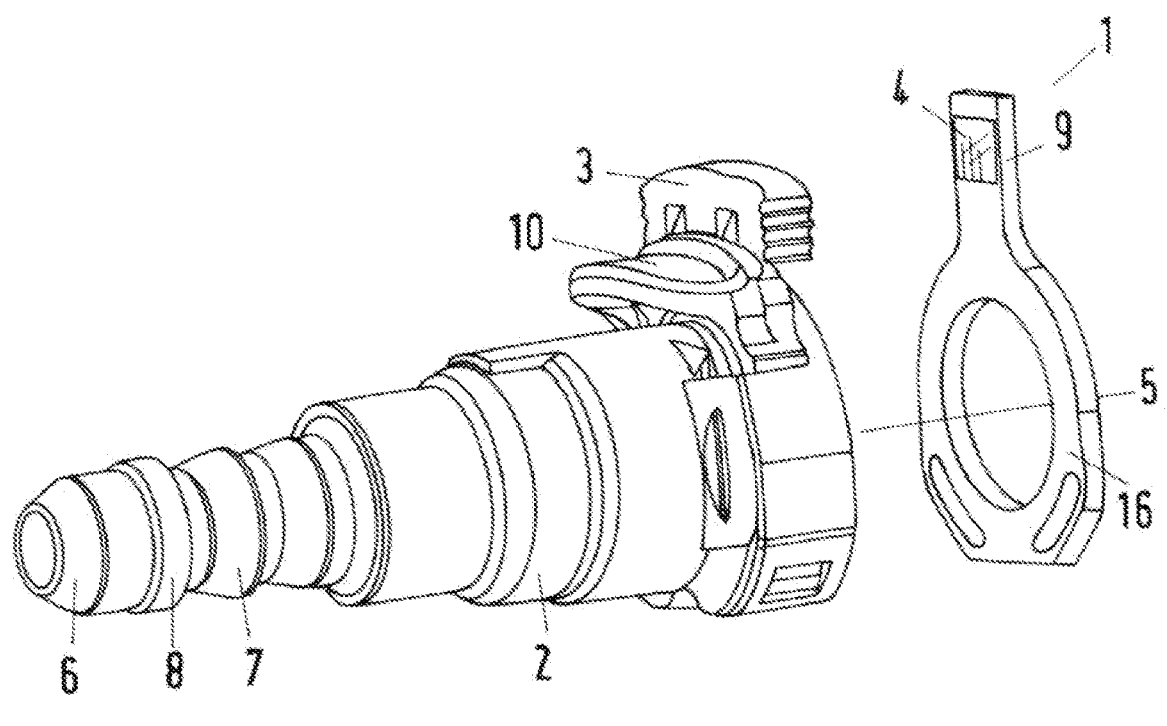
FIG. 5 shows an exploded view of a plug connector with verification element in a two-part embodiment.
Figure 6:
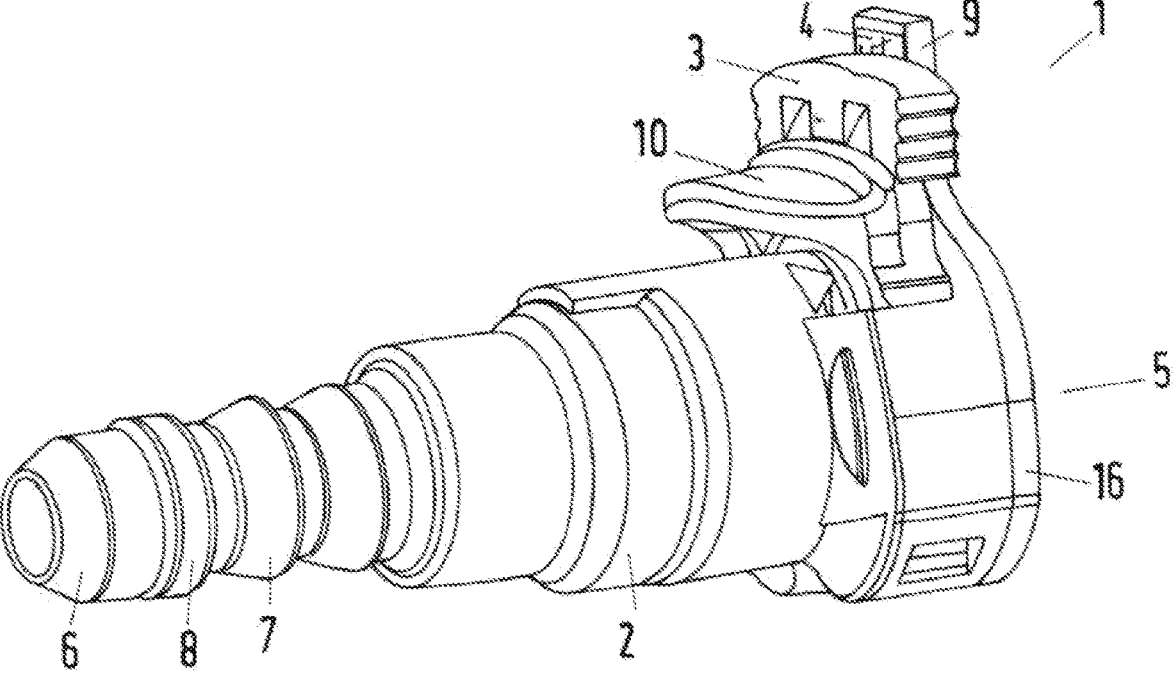
FIG. 6 shows a perspective view of a plug connector according to FIG. 5.

FIG. 5 shows an exploded view of a plug connector 1 according to FIG. 6. Here, the housing 2 and the tab 9 are produced separately from one another and in particular are adhesively bonded, welded or clipped to one another. The locking element 3 in FIGS. 5 and 6 is in an open position, whereby the verification element 4 is at least partly covered and in particular is not machine-readable.

As can be seen in FIG. 5, the verification element in this embodiment is affixed to a tab which protrudes radially from a ring 16, which in particular has the shape of the housing 2 at the end of the plug connector 1 at which the receiving space 5 is arranged. The ring 16, as shown in FIG. 6, is connected to the housing 2 at the end of the housing 2 at which the receiving space 5 is arranged.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The invention is not limited to any of the previously described embodiments and can be modified in a variety of ways.

All of the features and advantageous that can be found in the claims, the description and the drawing, inclusive of structural details, spatial arrangements and method steps, may be essential to the invention both in their own right and in the wide range of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 plug connector
2 housing
3 locking element
4 verification element
5 receiving space
6 connection piece
7 fir tree structure
8 outer seal
9 tab
10 handle
11 duct
12 first seal
13 second seal
14 spacer
15 plug
16 ring

The invention claimed is:

1. A plug connector,
comprising a housing,
a locking element, and
a verification element,
wherein the housing has a receiving space, a connection piece and a duct through which fluid can flow,
wherein the locking element is movable between an open position and a fastening position,
wherein in the open position of the locking element a plug can be inserted into the receiving space and in the fastening position of the locking element the plug that is inserted into the receiving space can be fastened by the locking element within the receiving space,
wherein the verification element in an open position of the locking element is at least partially covered by the latter and in a fastening position of the locking element is readable,
wherein the verification element is connected fixedly and non-movably to the housing,
wherein the verification element is mounted on a tab which protrudes in the radial direction with respect to the housing,
wherein the housing and the tab are formed in one piece with the verification element such that none of adhesive bonding, welding, and clipping are present between the housing and the tab, and
wherein a face of the tab is oriented in an axial direction of the housing, is parallel to a longitudinal extent of the housing, and is pointed in the direction of the locking element.

2. The plug connector as claimed in claim 1, wherein the plug is fastenable in the receiving space by a latching of the locking element.

3. The plug connector as claimed in claim 1, wherein the locking element is movable between the open position and the fastening position in a radial direction toward the housing.

4. The plug connector as claimed in claim 1, wherein the verification element is machine-readable.

5. The plug connector as claimed in claim 1, wherein the verification element has a machine-readable code based on optical information.

6. The plug connector as claimed in claim 5, wherein the code is a barcode or a QR code.

7. The plug connect as claimed in claim 1, wherein the verification element cannot be manipulated before or during assembly of the plug connector and is connected fixedly and non-movably to the housing when the locking element is in the open position and when the locking element is in the fastening position.

8. A method for producing and verifying a plug connection comprising the following method steps in the stated order:
providing a plug connector as claimed in claim 1,
inserting the plug into the receiving space of the plug connector,
moving the locking element from an open position into a fastening position, wherein the locking element in the fastening position interacts with the plug in the receiving space and fastens it in the receiving space,
checking the fastening of the plug in the receiving space by reading the verification element on the plug connector.

9. The method as claimed in claim 8, wherein the verification element is machine read.

* * * * *